US008023174B2

(12) United States Patent
Huang et al.

(10) Patent No.: US 8,023,174 B2
(45) Date of Patent: Sep. 20, 2011

(54) MEMS ARRAY SUBSTRATE AND DISPLAY DEVICE USING THE SAME

(75) Inventors: Sung-Hui Huang, Hsinchu (TW); Po-Wen Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 84 days.

(21) Appl. No.: 12/556,671

(22) Filed: Sep. 10, 2009

(65) Prior Publication Data

US 2011/0007379 A1 Jan. 13, 2011

(30) Foreign Application Priority Data

Jul. 8, 2009 (TW) ............................... 98123120 A

(51) Int. Cl.
*G02B 26/00* (2006.01)

(52) U.S. Cl. ......................... 359/290; 359/291; 359/245

(58) Field of Classification Search .................. 359/245, 359/290, 291
See application file for complete search history.

(56) References Cited

U.S. PATENT DOCUMENTS

| | | | | |
|---|---|---|---|---|
| 7,535,621 | B2 * | 5/2009 | Chiang | 359/291 |
| 2002/0196517 | A1 * | 12/2002 | Nimura | 359/245 |
| 2008/0165122 | A1 * | 7/2008 | Duthaler et al. | 345/107 |

* cited by examiner

*Primary Examiner* — Ricky L Mack
*Assistant Examiner* — James C Jones
(74) *Attorney, Agent, or Firm* — Chun-Ming Shih

(57) ABSTRACT

A micro electro-mechanical system (MEMS) array substrate includes a substrate, a plurality of first signal lines, a plurality of second signal lines, a plurality of MEMS switches and a plurality of pixel electrodes. The first signal lines are disposed on the substrate in parallel with one another as well as the second signal lines. The second signal lines intersect with the first signal lines, such that a plurality of pixel regions is defined on the substrate. Each MEMS switch is located at corresponding one of the intersections between the first signal lines and the second signal lines. Each pixel electrode is configured in corresponding one of the pixel regions and electrically connected with the corresponding MEMS switch Compare to thin film transistor, since the operation performance of the MEMS switches would not affected by carrier mobility and on-off current ratio, display performance of the display device can be easily improved. In addition, a display device using the MEMS array substrate is also provided.

19 Claims, 4 Drawing Sheets

MEMS ARRAY SUBSTRATE AND DISPLAY DEVICE USING THE SAME

This application claims priority to a Taiwan application No. 098123120 filed Jul. 8, 2009.

BACKGROUND

1. Field of the Invention

The invention relates to a display device, and more particular, to a display device with a micro electro-mechanical system (so-called MEMS) array substrate and the MEMS array substrate thereof.

2. Description of the Related Art

With progress of the display technique, more and more electrical products, such as computer, television, monitoring apparatuses mobile phones and digital cameras etc., are equipped with display devices.

In the present days, thin film transistors are configured in mostly display devices have as driving elements for controlling the operation of display medium. Since the mobility of carries of the inorganic semiconductor materials is larger than that of the organic semiconductor materials, the inorganic semiconductor materials, such as amorphous silicon, is used in conventional thin film transistors. Also, because the amorphous thin film transistors can be fabricated in low temperature, it has become the main stream in the thin film transistor market.

However, the display performance of the display device is requested more and more, so that the display device has to be provided with the advantages of higher carrier mobility or on-off current ratio. Accordingly, the amorphous thin film transistors could not satisfy the requests of the display device in next generation.

BRIEF SUMMARY

Therefore, the invention is directed to a MEMS array substrate for improving the display performance of display device using the same.

The invention is also directed to a display device with improved display performance.

The invention provides a MEMS array substrate including a substrate, a plurality of first signal lines disposed on the substrate in parallel with one another, a plurality of second signal lines disposed on the substrate in parallel with one another, a plurality of MEMS switches and a plurality of pixel electrodes. The second signal lines intersect with the first signal lines, such that a plurality of pixel regions is defined on the substrate. Each MEMS switch is disposed at corresponding one of the intersections between the first signal lines and the second signal lines. Each pixel electrode is configured in corresponding one of the pixel regions and electrically connected with the corresponding MEMS switch.

The invention provides a display device including the MEMS array substrate, a transparent substrate disposed above the MEMS array substrate and a display medium layer disposed between the MEMS array substrate and the transparent substrate.

The display device of the invention control the operation of the display medium by the MEMS switches of the MEMS array substrate. Since the material of the MEMS switches is conductive, and the on/off status of the MEMS switches is operated by controlling electric field to make whether the metal layers disposed at different layer electrically connecting to each other or not, the MEMS switches would not have the problems about carrier mobility and the on-off current ratio. This shows that the display device of the invention uses the MEMS switches to increase the display performance thereof. Therefore, the requests in use of the display device in new generation would be satisfied.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
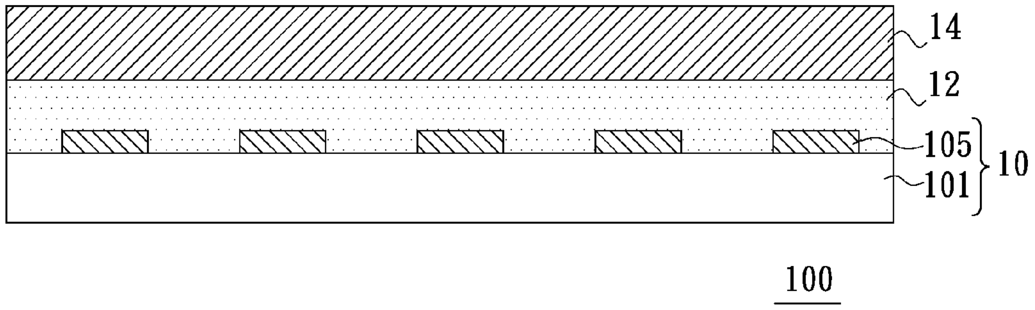
FIG. 1 is a schematic cross-section view of the display device according to an embodiment of the invention.
Figure 2:
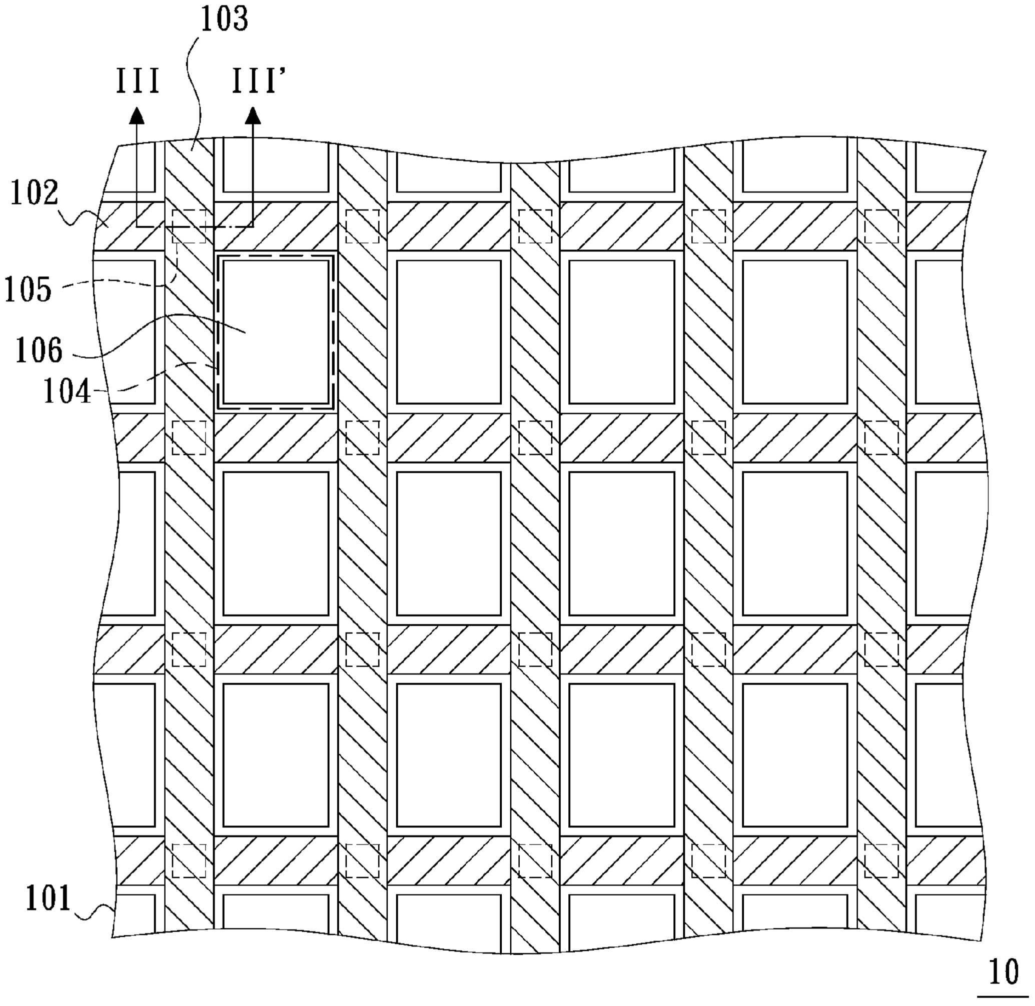
FIG. 2 is a schematic top view of a MEMS array substrate of the display device shown in FIG. 1.

FIG. 1 is a schematic cross-section view of the display device according to an embodiment of the invention. FIG. 2 is a schematic top view of a MEMS array substrate of the display device shown in FIG. 1. Referring to FIG. 1, the display device 100 includes a MEMS array substrate 10, a display medium layer 12 and a transparent substrate 14. The transparent substrate 14 is disposed above the MEMS array substrate 10, and the display medium layer 12 is disposed between the MEMS array substrate 10 and the transparent substrate 14. Specifically, the display medium layer 12 is, for example, an electro-phoretic layer or a liquid crystal layer.

Referring to FIG. 1 and FIG. 2, the material of the transparent substrate 14 is, for example, glass. The MEMS array substrate 10 includes a substrate 101, a plurality of first signal lines 102, a plurality of second signal lines 103, a plurality of MEMS switches 105 and a plurality of pixel electrodes 106. The first signal lines 102 are disposed on the substrate 101 in parallel with one another as well as the second signal lines 103. The second signal lines 103 intersect the first signal lines 102 and thus a plurality of pixel regions 104 are defined on substrate 101. The MEMS switches 105 are disposed at the intersections between the first signal lines 102 and the second signal lines 103, and the pixel electrodes 106 are disposed on corresponding one of the pixel regions 104 and electrically connected to the MEMS switch 105 corresponding thereto.

In this embodiment, the first signal lines 102 and the second signal lines 103 are, for example, data lines and scan lines respectively, but not limited hereto. In another embodiment, the first signal lines 102 may be data lines, and the second signal lines 103 may be scan lines.

Figure 3:
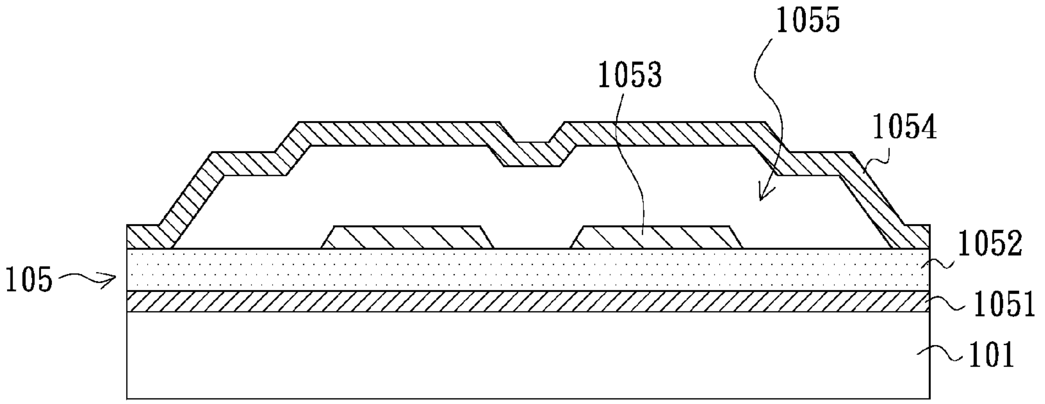
FIG. 3 is a schematic cross-section view along the line III-III' in the FIG. 2.

FIG. 3 is a schematic cross-section view along the line III-III' in the FIG. 2. Referring to FIG. 2 and FIG. 3, each MEMS switch 105 includes a first metal layer 1051, an insulating layer 1052, a second metal layer 1053 and a third metal layer 1054. The first metal layer 1051 is disposed on the substrate 101 and electrically connected to corresponding one of the first signal lines 102. The insulating layer 1052 is disposed on the first metal layer 1051. The second metal layer 1053 is disposed on the insulating layer 1052 and electrically connected to corresponding one of the pixel electrodes 106. The third metal layer 1054 is disposed on the second metal layer 1053 and electrically connected to corresponding one of the second signal lines 103. Specially, an insulating cavity 1055 is formed between the third metal layer 1054 and the second metal layer 1053.

Figure 4:
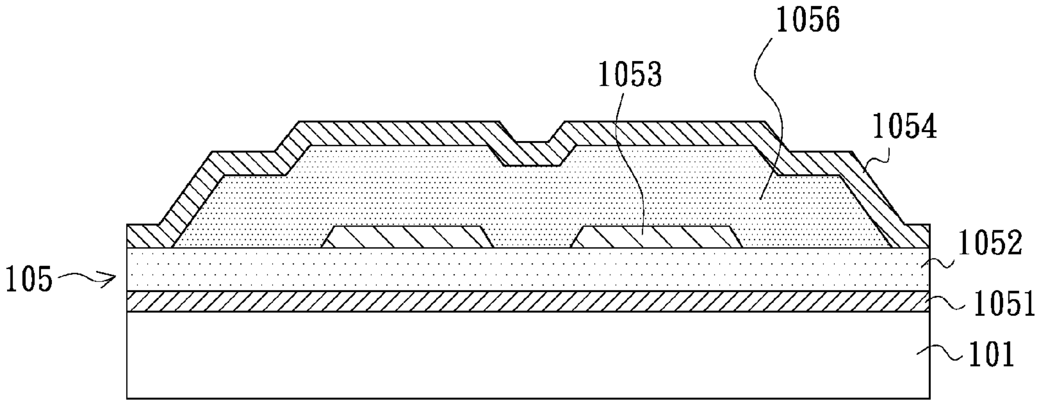
FIG. 4 is a schematic cross-section view of the MEMS switch shown in FIG. 3 during the manufacturing process thereof.

Further, the MEMS switch 105 is formed by forming the first metal layer 1051, the insulating layer 1052 and the second metal layer 1053 on the substrate 101 sequentially first. Then, a sacrificial layer 1056 is formed on the second metal layer 1052 and the third metal layer 1054 is formed on the sacrificial layer 1056, as shown in FIG. 4. Later, the sacrificial layer 1056 is removed by gas etch, and thus the MEMS switch 105 shown in FIG. 3 is formed. The materials of the first metal layer 1051 and the second metal layer 1053 are, for example, silver, chromium, alloys of molybdenum and chromium, alloys of aluminum and neodymium or nickel boride. The material of the insulating layer 1052 is, for example, silicon oxide or silicon nitride. The material of the third metal layer 1054 is magnetic metal, such as nickel/alloys of aluminum and neodymium or nickel boride/alloys of aluminum and neodymium.

Especially, for simplifying the manufacturing process of the MEMS array substrate 10, the first metal layer 1051 of each MEMS switch 105 may be formed at the same layer with the first signal lines 102, the second metal layer 1053 may be formed at the same layer with the pixel electrodes 106 and the third metal layer 1054 may be formed at the same layer with the second signal lines 103. Accordingly, if the second metal layer 1053 is formed at the same layer with the pixel electrodes, the second metal layer 1053 is made of transparent conductive material, such as indium tin oxide (ITO), indium zinc oxide (IZO) or indium gallium zinc oxide (IGZO).

The MEMS switch described in the aforementioned embodiments would be taken to be an example to expound the operation of the display device of the invention.

Figure 5:
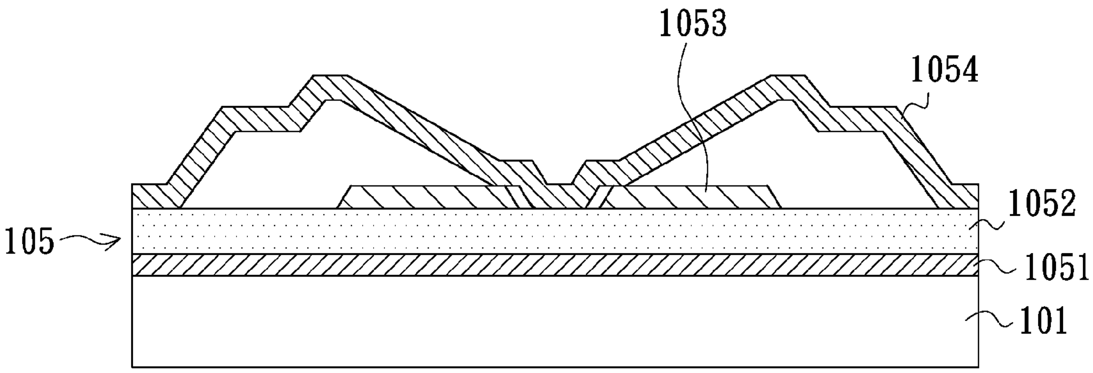
FIG. 5 is a diagram of the MEMS switch shown in FIG. 4 while there is a voltage differential between the third metal layer and the first metal layer.

FIG. 5 is a diagram of the MEMS switch shown in FIG. 4 while there is a voltage differential between the third metal layer and the first metal layer. Referring to FIG. 1, FIG. 2 and FIG. 5, a voltage differential between the first metal layer 1051 electrically connected to the first signal line 102 and the third metal layer 1054 electrically connected to the second signal line 103 resulted from applying voltage to the first signal line 102 and the second signal line 103 respectively by the driving circuit (not shown) of the display device 100. At this time, the third metal layer 1054 is expanded downward and contacts the second metal layer 1053 because of being attracted by the electric force induced from the electric field. Thus, the second metal layer 1053 is shorted with the third metal layer 1054 and has the same electric potential with each other. Accordingly, the signals inputted into the second signal line 103 can be transmitted to the pixel electrode 106 through the second metal layer 1053. Moreover, the operation status of the display medium layer 12 is decided according to the signals transmitted to the pixel electrode 106.

On the other hand, when the voltage differential between the first metal layer 1051 and the third metal layer 1054 is 0 V, the attracting force induced from the electric field between the first metal layer 1051 and the third metal layer 1054 would disappear. At this time, the third metal layer 1054 returns to the original status that is electrically insulated with the second metal layer 1053. Thus, the display status of the display device 100 is returned to the status at the time when the voltage applied to the first signal line 102 and the second signal line not yet.

Referring to FIG. 1 and FIG. 2, the display device 100 can achieve different display effects by controlling the operation status of the display medium layer 12 corresponding to each pixel region 104 by the MEMS switch 105. Since the MEMS switch 105 does not have the problems of carrier mobility and the on-off current ratio, the display performance of the display device 100 may be improved. Therefore, the use requests of the display device in new generation may be satisfied. Furthermore, the manufacturing process of the MEMS switch 105 is simpler than that of the amorphous thin film transistor, so that the manufacturing cost of the display device 100 may be reduced.

Figure 6:
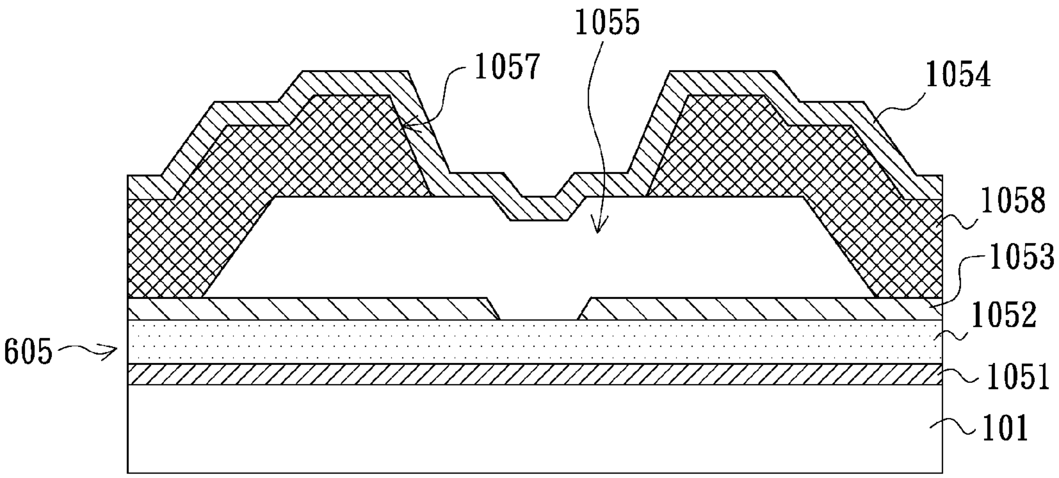
FIG. 6 is a schematic partial cross-section view of the MEMS array substrate according to another embodiment of the invention.

FIG. 6 is a schematic cross-section view of the MEMS switch according to another embodiment of the invention. Referring to FIG. 6, in the MEMS switch 605 of this embodiment, a supporting layer 1058 with an opening 1057 may be disposed between the third metal layer 1054 and the second metal layer 1053. The third metal layer 1054 is filled into the opening 1057, and the insulating cavity 1055 is formed between the supporting layer 1058 and the second metal layer 1053 and corresponding to the opening 1057.

Figure 7:
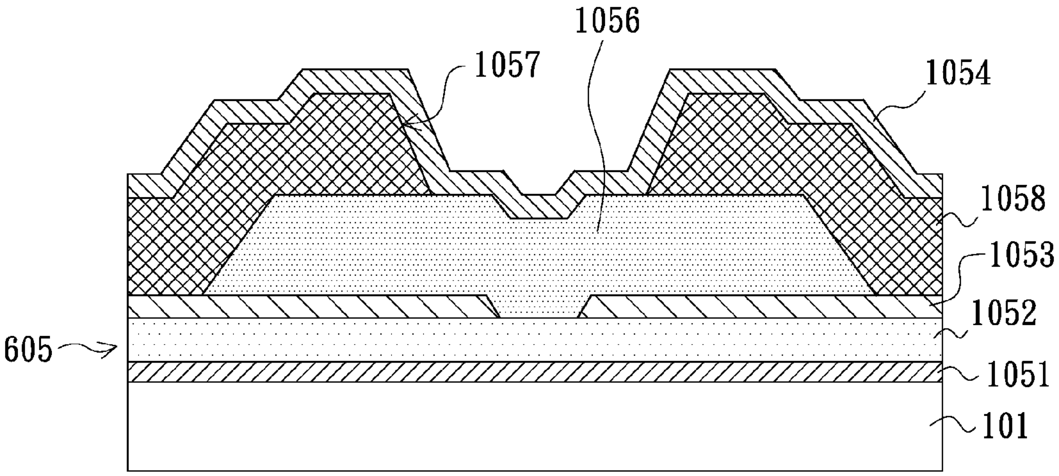
FIG. 7 is a schematic cross-section view of the MEMS switch shown in FIG. 6 during the manufacturing process thereof.

In detail, the MEMS switch 605 is formed by forming the first metal layer 1051, the insulating layer 1052, the second metal layer 1053 and the sacrificial layer 1056 on the substrate 101 sequentially first. Then, the supporting layer 1058 with the opening 1057 is formed on the sacrificial layer 1056 and the third metal layer 1054 is formed on the supporting layer 1058 and filled into the opening 1057, as shown in FIG. 7. Later, the sacrificial layer 1056 is removed by gas etch, and thus the MEMS switch 605 shown in FIG. 6 is formed.

Referring to FIG. 1, FIG. 2 and FIG. 6, a voltage differential between the first metal layer 1051 electrically connected to the first signal line 102 and the third metal layer 1054 electrically connected to the second signal line 103 resulted from applying voltage to the first signal line 102 and the second signal line 103 respectively by the driving circuit (not shown) of the display device 100. At this time, a portion of the third metal layer 1054 filled into the opening 1057 is expanded downward and contacts the second metal layer 1053 because of being attracted by the electric force induced from the electric field. Thus, the second metal layer 1053 is shorted with the third metal layer 1054 and has the same electric potential with each other. Accordingly, the signals inputted into the second signal line 103 can be transmitted to the pixel electrode 106 through the second metal layer 1053, and thus the display device 100 may display the pre-determined images.

It should be noted that since the supporting layer 1058 is disposed between the third metal layer 1054 and the second metal layer 1053 in this embodiment, the third metal layer 1054 can be prevented from bending downward to electrically contact to the second metal layer 1053 when the voltage is applied to the first metal layer 1051 not yet. Therefore, the unusual operation of the display device 100 may be averted.

In summary, the display device of the invention controls the operation of the display medium by the MEMS switches of the MEMS array substrate. Since the material of the MEMS switches is conductive, and the on/off status of the MEMS switches is operated by controlling electric field to make whether the metal layers disposed at different layer electrically connecting to each other or not, the MEMS switches would not have the problems about carrier mobility and the on-off current ratio. This shows that the display device of the invention uses the MEMS switches to increase the display performance thereof. Therefore, the requests in use of the display device in new generation would be satisfied.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A micro electro-mechanical system (MEMS) array substrate, comprising:

a substrate;

a plurality of first signal lines disposed on the substrate in parallel with one another;

a plurality of second signal lines disposed on the substrate in parallel with one another, wherein the second signal lines intersect with the first signal lines, and thus a plurality of pixel regions are defined on the substrate;

a plurality of MEMS switches disposed at intersections between the first signal lines and the second signal lines, wherein each MEMS switch comprises:

a first metal layer disposed on the substrate and electrically connected to corresponding one of the first signal lines;

an insulating layer disposed on the first metal layer;

a second metal layer disposed on the insulating layer; and a third metal layer disposed above the second metal layer and electrically connected with corresponding one of the second signal lines, wherein an insulating cavity is formed between the third metal layer and the second metal layer; and a plurality of pixel electrodes disposed on the pixel regions and electrically connected with the second metal layers of the MEMS switches respectively.

2. The MEMS array substrate as recited in claim 1, wherein each MEMS switch further comprises a supporting layer with an opening disposed between the second metal layer and the third metal layer, the third metal layer is filled into the opening and the insulating cavity is located between the supporting layer and the second metal layer and corresponds to the opening.

3. The MEMS array substrate as recited in claim 1, wherein each first metal layer is formed at the same layer with the first signal lines.

4. The MEMS array substrate as recited in claim 1, wherein each second metal layer is formed at the same layer with the pixel electrodes.

5. The MEMS array substrate as recited in claim 1, wherein each third metal layer is formed at the same layer with the second signal lines.

6. The MEMS array substrate as recited in claim 1, wherein materials of the first metal layer and the second metal layer comprise silver, chromium, alloys of molybdenum and chromium, alloys of aluminum and neodymium or nickel boride.

7. The MEMS array substrate as recited in claim 1, wherein material of the insulating layer comprises silicon oxide or silicon nitride.

8. The MEMS array substrate as recited in claim 1, wherein material of the third metal layer is magnetic metal.

9. The MEMS array substrate as recited in claim 8, wherein material of the third metal layer comprises nickel/alloys of aluminum and neodymium or nickel boride/alloys of aluminum and neodymium.

10. A display device, comprising:

a micro electro-mechanical system (MEMS) array substrate comprising:

a substrate;

a plurality of first signal lines disposed on the substrate in parallel with one another;

a plurality of second signal lines disposed on the substrate in parallel with one another, wherein the second signal lines intersect with the first signal lines, and thus a plurality of pixel regions are defined on the substrate;

a plurality of MEMS switches disposed at intersections between the first signal lines and the second signal lines, wherein each MEMS switch comprises:

a first metal layer disposed on the substrate and electrically connected to corresponding one of the first signal lines;

an insulating layer disposed on the first metal layer;

a second metal layer disposed on the insulating layer; and a third metal layer disposed above the second metal layer and electrically connected with corresponding one of the second signal lines, wherein an insulating cavity is formed between the third metal layer and the second metal layer; and a plurality of pixel electrodes disposed on the pixel regions and electrically connected with second metal layers of the MEMS switches respectively;

a transparent substrate disposed above the MEMS array substrate; and a display medium layer disposed between the MEMS array substrate and the transparent substrate.

11. The display device as recited in claim 10, wherein each MEMS switch further comprises a supporting layer with an opening disposed between the second metal layer and the third metal layer, the third metal layer is filled into the opening and the insulating cavity is located between the supporting layer and the second metal layer and corresponds to the opening.

12. The display device as recited in claim 10, wherein each first metal layer is formed at the same layer with the first signal lines.

13. The display device as recited in claim 10, wherein each second metal layer is formed at the same layer with the pixel electrodes.

14. The display device as recited in claim 10, wherein each third metal layer is formed at the same layer with the second signal lines.

15. The display device as recited in claim 10, wherein materials of the first metal layer and the second metal layer comprise silver, chromium, alloys of molybdenum and chromium, alloys of aluminum and neodymium or nickel boride.

16. The display device as recited in claim 10, wherein material of the insulating layer comprises silicon oxide or silicon nitride.

17. The display device as recited in claim 10, wherein material of the third metal layer is magnetic metal.

18. The display device as recited in claim 17, wherein material of the third metal layer comprises nickel/alloys of aluminum and neodymium or nickel boride/alloys of aluminum and neodymium.

19. The display device as recited in claim 10, wherein the display medium layer is electro-phoretic layer or liquid crystal layer.

* * * * *